United States Patent [19]
Brunkhardt

[11] Patent Number: 6,016,836
[45] Date of Patent: Jan. 25, 2000

[54] WATER SAVER SHOWER

[76] Inventor: Donald D. Brunkhardt, 2942 S. Trenton St., Denver, Colo. 80231

[21] Appl. No.: 09/132,853

[22] Filed: Aug. 11, 1998

Related U.S. Application Data

[60] Provisional application No. 60/055,514, Aug. 13, 1997.

[51] Int. Cl.[7] .................................................. G06F 15/46
[52] U.S. Cl. .................. 137/624.11; 251/30.02; 239/69
[58] Field of Search .................. 137/624.11, 624.13, 137/624.15, 552.7; 251/30.02; 239/69

[56] References Cited

U.S. PATENT DOCUMENTS

| | | | |
|---|---|---|---|
| 4,807,664 | 2/1989 | Wilson et al. | 137/624.11 |
| 4,921,209 | 5/1990 | Moineau | 137/624.11 |
| 5,121,511 | 6/1992 | Sakamoto et al. | 251/30.02 X |
| 5,699,833 | 12/1997 | Tsataros | 137/624.11 |
| 5,826,619 | 10/1998 | Roman | 137/624.11 |

*Primary Examiner*—Kevin Lee

[57] ABSTRACT

A preprogramable shower flow control device that utilizes timers to control an amount of time water flows unrestricted through a shower, an amount of time water flows through the shower in a restricted fashion by use of a solenoid operated valve, and an amount of time before the device resets for full water flow after the water is turned off. A security code is required to preset the timing intervals. A low voltage battery controls the timing operation and the device can be overridden where needed. The device is connected to a water service feed from a shower wall.

10 Claims, 3 Drawing Sheets

WATER SAVER SHOWER

This application claims benefit of Provisional application No. 60/055,514 filed Aug. 13, 1997.

BACKGROUND

1. Field of Invention

This invention relates to the taking of showers, specifically to the limitation or saving of water while showering.

2. Description of Prior Art

Any parent who has teenagers can attest to the need of somehow restricting the amount of time and water teenagers' use while taking a shower. In many, a family, nerves are often worn thin when a family member is using the shower while others are waiting. In other instances, kids are late to school or appointments because their "quick shower" turns into an "extended shower." Not to mention the cold water showers if you happen to be last in line.

Another problem of extended showers is the wasting of water and the energy used to process it and heat it. In many parts of the country and the world for that matter, water is a scarce and expensive commodity with conservationists seeking more and better ways to conserve water. Prior art has made some strides in this direction, but there seems to be a lack of enthusiasm for many of these devices. Devices that restrict the flow of water lack popularity especially with women as a restricted flow does little to thoroughly rise a full head of hair. Devices that shut off water flow after a predetermined period of time or volume of water often frustrate users because of the abrupt cessation of water flow. Other devices require control or set up every time they are used. While others are easily overridden or manipulated. Let's face it, many bathers and especially responsible adults believe in the spirit of conservation efforts but don't easily embrace devices that limit the enjoyment, the stimulation and the cleansing affect a shower brings.

OBJECTIVES AND ADVANTAGES

While no shower device satisfies every consideration, the intent of the Water Saver Shower is to give the bather a taste of both worlds. That is, an initial period of time wherein the bather enjoys full or "unrestricted" water flow and, a subsequent "restricted" flow of water if the bather does not finish within the "unrestricted" cycle. The objective of this "restricted" flow is to hasten the completion of the shower as a limited now of water through the showerhead provides less stimulation and enjoyment as that of a full or "unrestricted" flow of water. Additionally, this "restricted" flow of water inherently uses less water than that consumed during "unrestricted" water flow.

Other goals of the Water Saver Shower are to provide a device that is affordable, easy to install, and provide for hands free operation. This device also needs to be inexpensive to operate and not easily overridden. Another objective would be for the unit to be safe and would not interfere with normal shower on/off controls including the mixture of hot and cold water. Also, it would be desirable for the unit to be manually operated when necessitated by battery failure or other malfunction. These features, as well as others, are more fully described herein below.

BRIEF DESCRIPTION OF THE DRAWINGS

FIG. 1-A shows a side view of a hexagon tipped probe;

DETAILED DESCRIPTION OF THE PREFERRED EMBODIMENT

Figure 1:
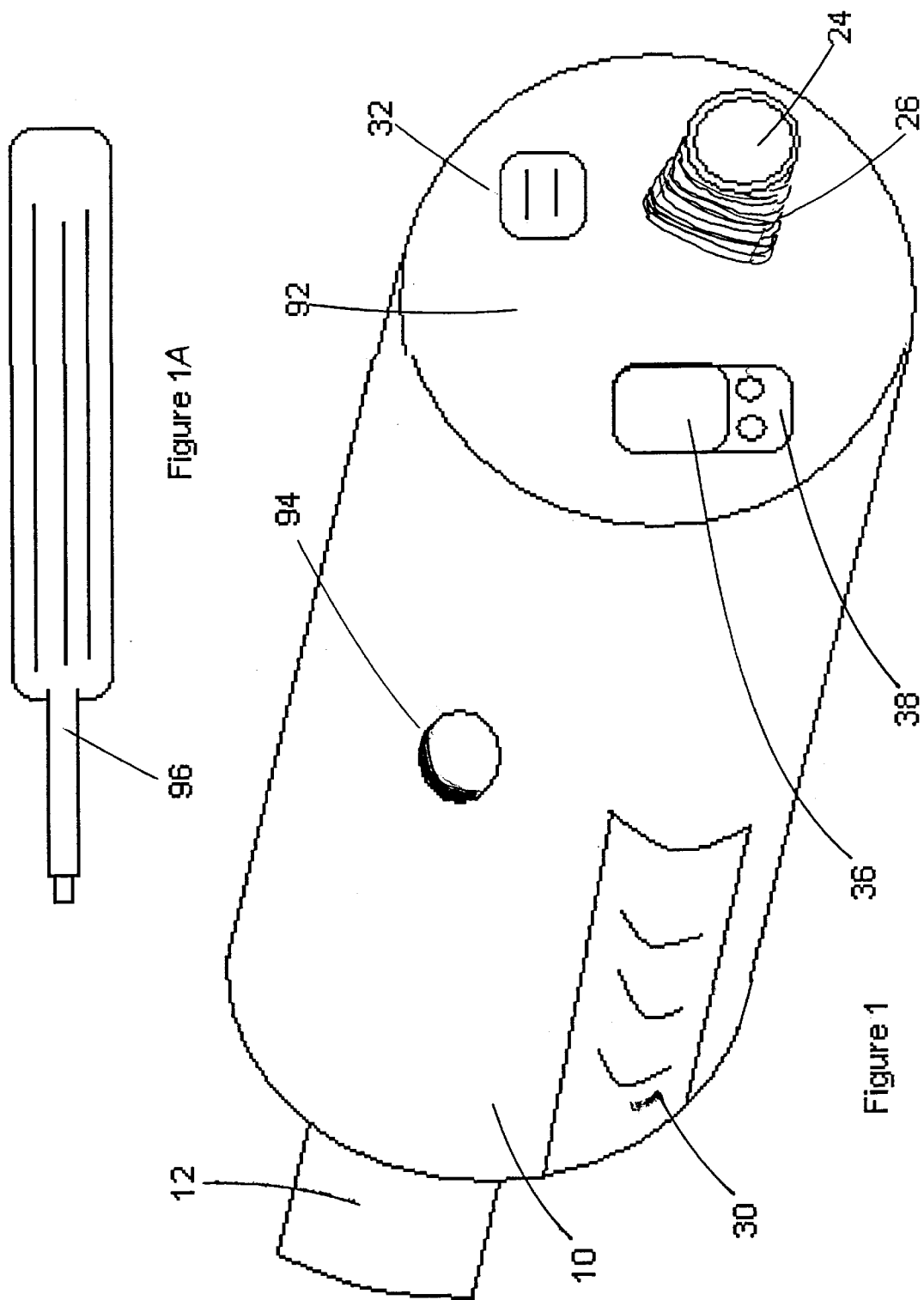
FIG. 1 shows a frontal perspective view of the water saving device.
Figure 2:
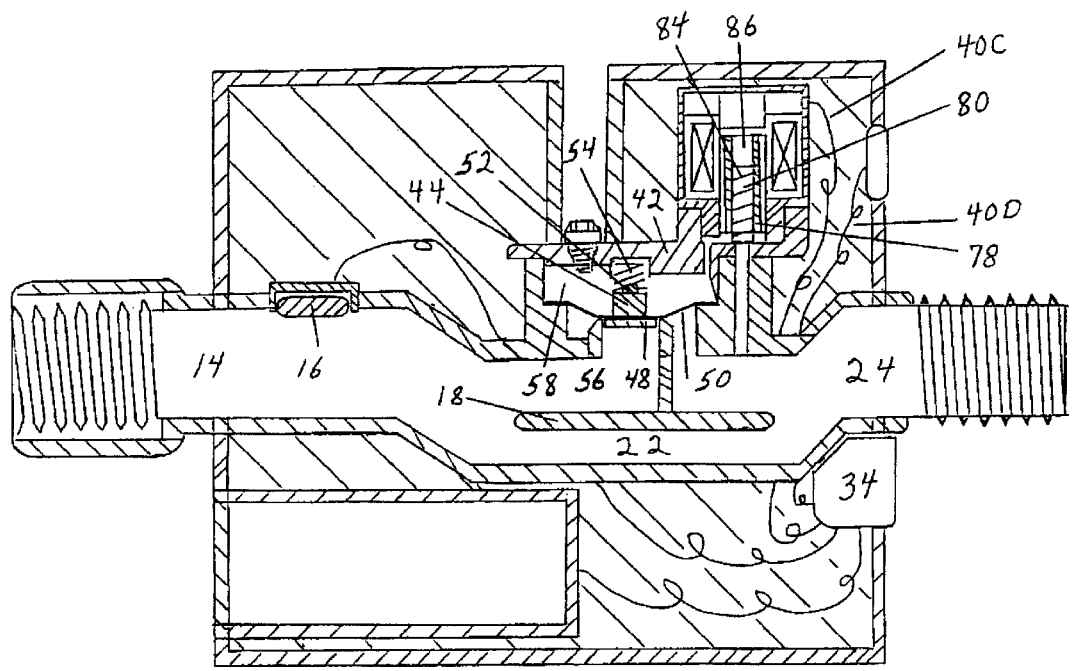
FIG. 2 shows a cross-sectional view of the body showing the inlet, outlet, bypass channel, and solenoid valve in a closed position.
Figure 3:
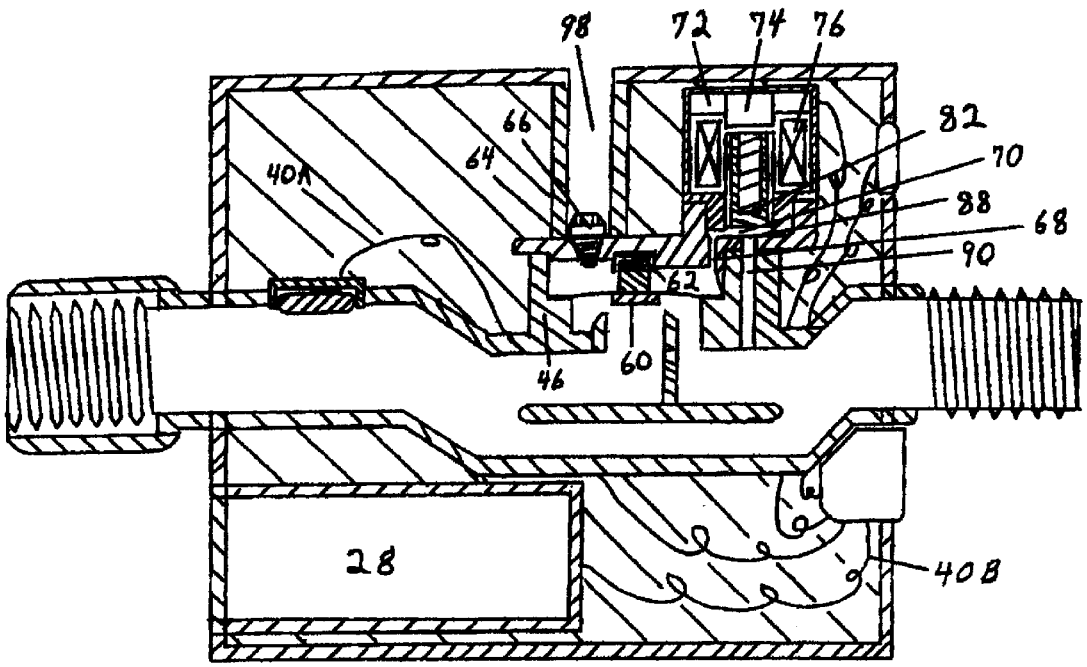
FIG. 3 shows a cross-sectional view of the body showing the inlet, outlet, bypass channel, and solenoid valve in an open position.

The Water Saver Shower is a water control system placed between a water supply pipe and a showerhead mechanism. In FIGS. 1, 2, and 3 the main components of this water saving device are a housing 10 which contains the following components: an inlet connection 12; an inlet channel 14; a water pressure sensitive switch 16: a channel divider 18; a low voltage DC operated solenoid valve 72; a bypass channel 22; an outlet channel 24; an outlet connection 26: a dry cell battery compartment 28; a low voltage (say, 9 volts) DC battery (not shown); a dry cell battery access cover 30; an alarm 32; a central processing unit (CPU) 34 including timers, a readout display 36 and control buttons 38; and electrical leads (various, named herein).

The inlet connection 12 and the outlet connection 26 are standard size for normal household shower plumbing connections. The water pressure sensitive switch 16 located in the inlet channel 14 is connected, through electrical leads 40A, to the CPU 34. The solenoid value housing 42 contains the following components: an inlet chamber housing 46; a diaphragm housing 44 which contains a watertight seal 48; an elastic diaphragm 50; a diaphragm-positioning member 52 with a diaphragm spring 54. The elastic diaphragm 50 separates an inlet chamber 56 from a main valve chamber 58. An orifice 60 located slightly off center in the central part of the diaphragm housing 44 allows for communication between the inlet chamber 56 and the main valve chamber 58. The main valve chamber 58 contains a spring cavity 62 which houses one end of the diaphragm spring 54, the other end of the diaphragm spring 54 engages the upper protrusion of the diaphragm positioning member 52, and a bleed drain 64 and a bleed drain screw 66 with a hexagon head. On the opposite side of the main valve chamber 58 from the bleed drain 64 is a connecting channel 68 that leads to a lower solenoid chamber 70.

Above the lower solenoid chamber 70 is a solenoid 72, which contains a magnet core 74, and solenoid coils 76 situated around a cylinder 78. The cylinder 78 contains a plunger 80 with a water seal membrane 82 on one end, and a plunger spring 84 on the other end. The cylinder 78 is longer than the plunger 80. The plunger 80 when in the upper part of the cylinder 78 voids the lower solenoid chamber 70 and when positioned in the lower part of the cylinder 78 voids an upper solenoid chamber 86.

Directly below the water seal membrane 82 end of the plunger 80 is a plunger port 88 that leads to a plunger channel 90. This plunger channel 90 leads t) the outlet channel 24. When the water seal membrane 82 on the plunger 80 comes in contact with the plunger port 88, a watertight seal is formed. The solenoid coils 76 are connected, through electrical lead 40C. to the CPU 34.

Figure 4:
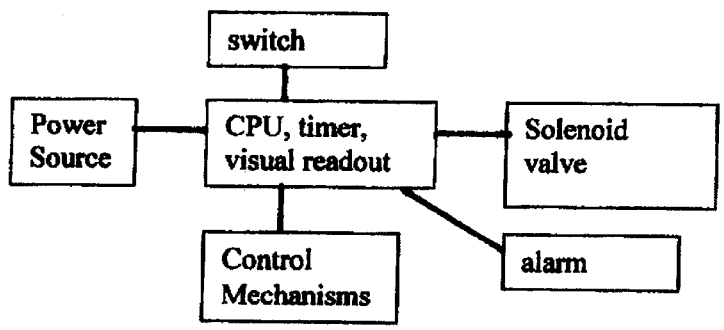
FIG. 4 shows the electrical functions of the invention.

The CPU 34 is housed within the Water Saver Shower and contains logic circuits, timers, a readout display 36 and control buttons 38 as shown in FIG. 4. The readout display 36 and controls buttons 38 are located on an external front panel 92 of the housing 10. The CPU 34 connects, through electrical leads 40D, the alarm 32 located or the external front panel 92 and the low voltage DC battery (not shown), through electrical leads 40B, located in the dry cell battery compartment 28. The housing 10 is water tight to external moisture. On the top of the housing 10 are a bleed screw access port 94 and a bleed screw channel 98 that leads to the bleed drain screw 66. Separate and apart of the assembly is a hexagon tipped probe 96, as shown in FIG. 1-A.

Operation of Water Saver Shower

An Overview of Operation

With the Water Saver Shower, a bather starts showering by turning on the water control valve commonly located on the shower/tub wall. The flow of water entering the Water Saver Shower passes through the device in an "unrestricted" fashion providing the bather a flow of water much the same as the bather had prior to installation of the Water Saver Shower unit. No special controls or settings are needed to activate or use the Water Saver Shower during normal use. Controls and settings are preset at the time of installation.

This "unrestricted" water flow will last for a pre-selected time frame. As the bather approaches the end of this "unrestricted" interval, an alarm 32 will sound altering ("alert interval") the bather that the "unrestricted" flow of water is about to end. At this point the bather has the option of completing their shower or continuing. If the bather continues on and exhausts the "unrestricted" time interval, the Water Saver Shower will then default into its "restricted" mode. This "restricted" mode delivers much less water to the bather or approximately 60% of the "unrestricted" water flow. This "restricted" water flow will provide enough water flow to allow the bather to finish rinsing off, etc, however, the full stimulating affect of an "unrestricted" interval will not be present. The desired tendency of this "restricted" interval would be for the bather to bring the shower to a close or, at least, consume much less water.

When the bather finishes showering, regardless of the interval, the Water Saver Shower goes into a "reset" interval. This "reset" interval prevents bathers from using the shower in an "unrestricted" mode until after the "reset" interval has elapsed.

Set Up and Pre Selection of Intervals

At time of installation, three showering intervals are set utilizing the control buttons and readout display on the front panel. These three intervals are as follows:

Unrestricted Interval ("unrestricted")—the period of full water flow;

Alert Interval ("alert")—the lead-time allowed before "unrestricted" water flow ceases and "restricted" flow begins. Bather is altered of this time frame with a sound from the alarm 32; and, Reset Interval ("reset")—the period of time after shower competition before the solenoid valve 72 can be activated again allowing full "unrestricted" flow.

Control or setting of these intervals can be accomplished only by entering an access code of, say, 5 to 8 digits. The access code, established by the user at lime of installation, should be an unfamiliar sequence of numbers and NOT easy to remember numbers like social security or home phone numbers, etc. The obvious reason is to discourage overriding and manipulation of the system.

An example of these intervals might be: "unrestricted" interval 12 minutes; "alert" interval 1.5 minutes (90 seconds); and, "reset" interval 7 minutes. Individual use and custom can help determine initial settings, and subsequent fine-tuning can be achieved through trial and error. The head of household or other responsible person would retain and keep the access code and hexagon tipped probe 96 in a safe place.

Use of Water Saver Shower

As a bather turns on the main water control valve, water enters the Water Saver Shower from the supply line through the inlet connection 12. As water volume builds in the inlet channel 14, water pressure builds and closes the pressure sensitive, Witch 16 which, in turn, signals through electrical leads 40A, the CPU 34. The CPU 34 sends an electrical current, through electrical leads 40C, to the solenoid coils 76. The electrical current sent to the solenoid coils 76 is momentary in nature, just long enough to create a magnetic field around the cylinder 78, which attracts upward the plunger 80. Once the plunger 80 is pulled upward and occupies the space of the upper solenoid chamber 86 by the magnetic force of the excited solenoid coils 76, the electrical current to these solenoid coils 76 is terminated. The plunger 80 will stay in the upper solenoid chamber 86 by the action of the magnetic core 74 against the plunger 80. This latching or holding of plunger 80 in the upper solenoid chamber 86 without the help of an electrical current saves considerable life of the low voltage DC battery (not shown).

This upward movement of the plunger 80 unseats the water seal membrane 82 from the plunger port 88, which opens the plunger channel 90. The water pressure in the main valve chamber 58, connecting channel 68, and lower solenoid chamber 70 causes the water to release through the plunger channel 90. This releasing of water from the main valve chamber 58 creates an imbalance of water pressure between the inlet chamber 56 and the main valve chamber 58, which causes the elastic diaphragm 50 and the watertight seal 48 to disengage from the inlet chamber housing 46. This unseating of the elastic diaphragm 50 opens a passageway that is separate and distinct from the bypass channel 22 and allows water to flow from the inlet chamber 56 to the outlet channel 24. This low of water through the inlet chamber 56 to the outlet channel 24 coupled with the water flowing freely through the bypass channel 22 allows for an "unrestricted" or full flow of water through outlet connection 26, as shown in FIG. 3. The channel divider 18 allows for water to flow freely through the bypass channel 22 independent of the actions of the solenoid valve 72.

At the time the electric current was sent to the solenoid coils 76 from the CPU 34, the CPU 34 also activates timers 1 and 2. These timers start advancing toward the completion of their respective preset intervals; the "unrestricted" interval for timer 1 and the "alert" interval for timer 2. During this "unrestricted" flow, a bather enjoys full water flow, which can be equated to that delivered prior to installation of the Water Saver Shower. If the bather does not finish showering by the time the timer 2 advances to) the "alert" mode, the CPU 34 will send a current, through electric wires 40D, to the alarm 32. The alarm 32 will sound alerting the bather that the "unrestricted" flow is about to end. If the bather continues to shower and the "unrestricted" time interval expires, the CFU 34 will then signal, through electric wires 40C, the solenoid coils 76. This time, however, the electric current sent to the solenoid coils 76, through electrical leads 40C, is sent in the opposite direction. This reversal of current although momentary in nature is sufficient to repeal the plunger 80 downward overcoming the attraction of the magnetic core 74. The plunger spring 84 expands and holds the plunger 80 in the closed position with the water seal membrane 82 seating against the plunger port 88 thus blocking off the flow of water to the plunger channel 90.

The action of the magnetic core 74 holding the plunger 80 in the "open" position and the action of the bias force of the plunger spring 84 holding the plunger 80 in the down or "closed" position is independent of the solenoid coils 76. The momentary electrical signals that affect the upward and downward movement of the plunger 80 consumes a low amount of current and consequently saves on the life of the low voltage DC battery (not shown).

With the plunger port 88 closed, water pressure in the main valve chamber 58 builds. The elasticity of the elastic diaphragm 50 and the diaphragm spring 54 extending will force the watertight seal 48 downward and to seat on the inlet chamber housing 58. This seating of the watertight seal 48 closes off the water flow from the inlet chamber 56 to the outlet channel 24 ending the "unrestricted" flow of water. If the bather continues to shower, the bather will continue to get water flow, but now only through the bypass; channel 22. This bypass channel 22 is of such a size as to limit the flow of water through it to be that of approximately 60% of that delivered to the outlet channel 24 during the "unrestricted" interval. The Water Saver Shower with water flowing through the bypass channel 22 only is now in its "restricted" mode as shown in FIG. 2.

This "restricted" water flow allows the bather to continue to bath, rinse off, etc. but under less than desirable conditions. The objective would be for the bather to bring the shower to a hasty close as the reduced volume of water would be less stimulating and not as enjoyable as a full or "unrestricted" flow of water. Also, bathing during this "restricted" interval consumes considerably less water.

When the bather finishes showering, regardless of the interval, the Water Saver Shower must go through its "reset" interval before "unrestricted" water flow can be achieved again. As the bather turns off the main supply valve, the diminished water pressure in the inlet channel 14 opens the water pressure sensitive switch 16. The water pressure sensitive switch 16 then signals, through electric wires 40A, the CPU 34 to begin the "reset" timer or timer 3. During this predetermined "reset" interval the CPU 34 prevents an electrical current from exciting the solenoid coils 76. After the "reset" time interval has expired, the Water Saver Shower can again be operated with an "unrestricted" flow of water.

An important safety feature inherent in the operation of this unit is that the Water Saver Shower does not function as the main on/off water value for the shower unit. Control of this important function as well as the mixture of hot and cold water remains with the main shower valve unit. Also, the low voltage DC battery minimizes any electrical shock or hazard. Additionally, the Water Saver Shower has a backup system if the battery should fail or other malfunction should occur. By inserting the hexagon tipped probe 96 (FIG. 1-A) into the bleed screw access port 94 and through the bleed screw access channel 98, the hexagon tipped probe 96 will engage the hexagon head of the bleed drain screw 66. By rotating the bleed drain screw 66 counterclockwise, water releases through the bleed drain 64 and the rustling drop in pressure within the main valve chamber 58 will open the solenoid valve 72 as previously explained. Rotating the bleed drain screw 66 clockwise will close the solenoid valve 72.

The reader will see that The Water Saver Shower is a practical, safe and economical alternative to prior art and appeases the agendas of conservationists, individuals, parents, etc. It is anticipated that water departments, city councils, etc. will embrace this concept.

While the Water Saver Shower has been described with reference to particular embodiments, it is not intended to illustrate or describe all of the equivalent forms or ramifications. Also, the words used are words of description rather than limitation and various changes may be made without departing from the spirit or scope of this Water Saver Shower.

I claim:

1. A timed water control valve device which comprises:
a) a housing;
b) a connection for the inlet of water from a water source;
c) a water channel that contains a switch that activates when water enters the channel;
d) a channel divider that divides the flow of water between an inlet chamber and a bypass channel;
e) a diaphragm which houses a positioning member with a diaphragm spring;
f) an orifice located in a diaphragm housing that allows for communication between the inlet chamber and a main valve chamber;
g) a main valve chamber contains a spring cavity which houses one end of the diaphragm spring, the other end of the diaphragm spring engages an upper protrusion of the diaphragm positioning member, and a bleed drain screw;
h) a connecting channel that leads from the main valve chamber to a lower solenoid chamber; above the lower solenoid chamber is a solenoid which contains a magnetic core; a cylinder inside the solenoid contains a plunger with a water seal membrane on one end, and a plunger spring on the other end; the cylinder is longer than the plunger; the plunger when in an upper part of the cylinder voids the lower solenoid chamber and when positioned in a lower part of the cylinder voids the upper solenoid chamber;
i) directly below the water seal membrane end of the plunger is a plunger port that leads to a plunger channel; the plunger channel leads to an outlet channel; when the water seal membrane of the plunger comes in contact with the plunger port, a watertight seal is formed;
j) a CPU is housed within the housing and contains logic circuits, timers, a readout display, and control mechanisms; the readout display and control mechanisms are visible on the outside of the housing;
k) an alarm is located on an external housing;
l) a battery power compartment is accessible from the external housing; and
m) an outlet channel and an outlet connection.

2. The invention defined in claim 1 wherein a first timer means activates signal producing means a predetermined time before closing of a valve.

3. The invention defined in claim 2 wherein the bypass channel is of such a size to substantially restrict the flow of water through the device when said valve device is closed.

4. The invention defined in claim 2 wherein a timer prevents said valve from reopening before a predetermined time interval has expired.

5. The invention defined in claim 4 wherein an interval of time said valve remains open is predetermined.

6. The invention defined in claim 5 wherein a notification time interval, by the alarm sounding, that said valve will close is predetermined.

7. The invention defined in claim 1 wherein the solenoid is latching and not requiring constant electrical charge to remain open.

8. The invention defined in claim 6 wherein said intervals are determined only after entering a lengthy access code into the CPU by utilizing the readout display and control mechanisms.

9. The invention defined in claim 1 wherein a full or unrestricted flow of water can be accomplished through the opening of the bleed screw.

10. The invention defined in claim 1 wherein said valve device can be powered by a portable, low voltage power source.

* * * * *